United States Patent
Dankberg et al.

(10) Patent No.: US 11,469,914 B2
(45) Date of Patent: Oct. 11, 2022

(54) SYSTEM, METHOD AND APPARATUS FOR SUBSCRIBER USER INTERFACES

(75) Inventors: Mark Dankberg, Encinitas, CA (US); Jim Esserman, La Jolla, CA (US); Keven Lippert, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 348 days.

(21) Appl. No.: 13/572,424

(22) Filed: Aug. 10, 2012

(65) Prior Publication Data

US 2014/0047103 A1 Feb. 13, 2014

(51) Int. Cl.
| | |
|---|---|
| H04L 12/14 | (2006.01) |
| H04M 15/00 | (2006.01) |
| H04L 41/18 | (2022.01) |
| H04L 43/067 | (2022.01) |
| H04L 43/0882 | (2022.01) |
| H04L 43/16 | (2022.01) |
| H04L 41/0896 | (2022.01) |
| H04L 67/306 | (2022.01) |

(52) U.S. Cl.
CPC ........ *H04L 12/1489* (2013.01); *H04M 15/58* (2013.01); *H04M 15/8016* (2013.01); *H04M 15/8027* (2013.01); *H04L 41/0896* (2013.01); *H04L 41/18* (2013.01); *H04L 43/067* (2013.01); *H04L 43/0882* (2013.01); *H04L 43/16* (2013.01); *H04L 67/306* (2013.01)

(58) Field of Classification Search
CPC ..... H04L 47/10; H04L 67/30; H04L 12/1489; H04L 67/306; H04L 43/067; H04L 43/0882; H04L 43/16; H04M 15/58; H04M 15/8016; H04M 15/8027

USPC .......................................................... 709/224
See application file for complete search history.

(56) References Cited

U.S. PATENT DOCUMENTS

| | | | | |
|---|---|---|---|---|
| 6,031,528 | A  * | 2/2000 | Langfahl, Jr. | ........... H04L 41/00 |
| | | | | 709/224 |
| 6,272,539 | B1 * | 8/2001 | Cuomo et al. | ................. 709/223 |
| 6,578,077 | B1 * | 6/2003 | Rakoshitz et al. | ............ 709/224 |

(Continued)

FOREIGN PATENT DOCUMENTS

| | | | | |
|---|---|---|---|---|
| CA | 2304543 A1 * | 4/1999 | .......... | G06F 11/0709 |
| CA | 2304609 A1 * | 4/1999 | .......... | G06F 9/3836 |

(Continued)

OTHER PUBLICATIONS

H3C, Multi-Core Distributed NetStream Technology White Paper, 2010.*

(Continued)

*Primary Examiner* — Emmanuel L Moise
*Assistant Examiner* — Robert A Shaw
(74) *Attorney, Agent, or Firm* — Holzer Patel Drennan

(57) ABSTRACT

Methods, apparatus, and systems manage use of shared network resources among subscribers to a data communication service. In some implementations, a first metric is computed representing a subscriber's use of the shared network resources. A second metric may also be computed that represents the amount of network congestion of the shared network resources. Data derived from the first metric and the second metric may then be presented to the subscriber. The data may be transmitted to the subscriber over a network and/or the data may be displayed to the subscriber on an electronic display.

21 Claims, 9 Drawing Sheets

(56) References Cited

U.S. PATENT DOCUMENTS

| | | | | |
|---|---|---|---|---|
| 6,961,716 | B2* | 11/2005 | Rhodes | 705/52 |
| 6,975,330 | B1* | 12/2005 | Charlton et al. | 345/593 |
| 7,433,943 | B1* | 10/2008 | Ford | H04L 12/5695 370/235 |
| 7,940,685 | B1* | 5/2011 | Breslau | H04L 43/0835 370/251 |
| 7,987,252 | B2* | 7/2011 | Kagan | H04L 47/122 709/217 |
| 8,046,694 | B1* | 10/2011 | Lappas et al. | 715/740 |
| 8,874,722 | B2* | 10/2014 | Gooding et al. | 709/224 |
| 2002/0046277 | A1* | 4/2002 | Barna | H04L 12/14 709/224 |
| 2003/0028631 | A1* | 2/2003 | Rhodes | 709/224 |
| 2004/0052212 | A1* | 3/2004 | Baillargeon | 370/235 |
| 2005/0041656 | A1* | 2/2005 | Dubois et al. | 370/389 |
| 2005/0052992 | A1* | 3/2005 | Cloonan | H04L 41/5025 370/229 |
| 2005/0108444 | A1* | 5/2005 | Flauaus | H04L 41/0853 710/15 |
| 2005/0128947 | A1* | 6/2005 | Silverman | 370/232 |
| 2005/0216421 | A1* | 9/2005 | Barry | G06F 11/0709 705/64 |
| 2005/0216584 | A1* | 9/2005 | Chisholm | 709/224 |
| 2005/0228985 | A1* | 10/2005 | Ylikoski et al. | 713/153 |
| 2006/0028999 | A1* | 2/2006 | Iakobashvili et al. | 370/252 |
| 2006/0189330 | A1* | 8/2006 | Nelson et al. | 455/457 |
| 2006/0233100 | A1* | 10/2006 | Luft | H04L 41/0896 370/229 |
| 2006/0291473 | A1* | 12/2006 | Chase et al. | 370/395.5 |
| 2007/0028142 | A1* | 2/2007 | Elsner | H04L 43/045 714/25 |
| 2007/0067296 | A1* | 3/2007 | Malloy et al. | 707/8 |
| 2007/0081459 | A1* | 4/2007 | Segel et al. | 370/230 |
| 2007/0081554 | A1* | 4/2007 | Saffre | 370/468 |
| 2007/0133603 | A1* | 6/2007 | Weaver | H04L 43/0882 370/468 |
| 2007/0156661 | A1* | 7/2007 | Allen | G06F 17/30554 |
| 2008/0002677 | A1* | 1/2008 | Bugenhagen | H04L 12/14 370/356 |
| 2008/0005156 | A1* | 1/2008 | Edwards | H04L 29/06027 |
| 2008/0037552 | A1* | 2/2008 | Dos Remedios et al. | 370/395.21 |
| 2008/0049615 | A1* | 2/2008 | Bugenhagen | 370/230.1 |
| 2008/0049641 | A1* | 2/2008 | Edwards | H04L 12/66 370/253 |
| 2008/0052628 | A1* | 2/2008 | Bugenhagen | H04L 41/0896 715/736 |
| 2008/0052784 | A1* | 2/2008 | Wiley | H04L 41/0896 726/28 |
| 2008/0130495 | A1* | 6/2008 | Dos Remedios et al. | 370/230 |
| 2008/0159133 | A1* | 7/2008 | Yeung | H04W 28/10 370/230 |
| 2008/0313327 | A1* | 12/2008 | Sewall et al. | 709/224 |
| 2009/0109847 | A1* | 4/2009 | Stephenson et al. | 370/232 |
| 2010/0035576 | A1* | 2/2010 | Jones et al. | 455/406 |
| 2010/0061261 | A1* | 3/2010 | Bugenhagen | H04L 12/2602 370/252 |
| 2010/0061266 | A1* | 3/2010 | Bugenhagen | 370/253 |
| 2010/0085874 | A1* | 4/2010 | Noy | H04L 12/5695 370/230 |
| 2010/0144310 | A1* | 6/2010 | Bedingfield, Sr. | H04L 12/1417 455/405 |
| 2010/0198698 | A1* | 8/2010 | Raleigh | G06Q 30/0601 705/26.1 |
| 2010/0211509 | A1* | 8/2010 | Jacobs | 705/302 |
| 2010/0293275 | A1* | 11/2010 | Rezaiifar et al. | 709/225 |
| 2010/0330998 | A1* | 12/2010 | Park | H04W 74/006 455/436 |
| 2011/0044353 | A1 | 2/2011 | Foottit et al. | |
| 2011/0096665 | A1* | 4/2011 | McCann | H04L 47/10 370/235 |
| 2011/0199921 | A1* | 8/2011 | Damnjanovic et al. | 370/252 |
| 2011/0292880 | A1* | 12/2011 | Yun et al. | 370/328 |
| 2012/0023236 | A1* | 1/2012 | Backholm | H04L 47/20 709/226 |
| 2012/0087319 | A1* | 4/2012 | Raleigh et al. | 370/329 |
| 2012/0101952 | A1* | 4/2012 | Raleigh | G06Q 30/016 705/304 |
| 2012/0120798 | A1* | 5/2012 | Jacquet | H04L 43/0882 370/230 |
| 2012/0140624 | A1* | 6/2012 | Denman et al. | 370/230.1 |
| 2012/0147772 | A1* | 6/2012 | Kazmi et al. | 370/252 |
| 2012/0158947 | A1* | 6/2012 | Hassan | H04L 41/5022 709/224 |
| 2012/0158949 | A1* | 6/2012 | Lee | 709/224 |
| 2012/0192075 | A1* | 7/2012 | Ebtekar et al. | 715/738 |
| 2012/0230186 | A1* | 9/2012 | Lee | G06F 17/30554 |
| 2012/0276867 | A1* | 11/2012 | McNamee | H04L 12/1407 455/406 |
| 2013/0016667 | A1* | 1/2013 | Blomqvist | H04L 41/0896 715/736 |
| 2013/0065551 | A1* | 3/2013 | Raleigh et al. | 455/405 |
| 2013/0132854 | A1* | 5/2013 | Raleigh | H04W 4/60 715/738 |
| 2013/0223222 | A1* | 8/2013 | Kotecha et al. | 370/235 |
| 2013/0272144 | A1* | 10/2013 | Dong | H04L 12/66 370/253 |
| 2013/0279521 | A1* | 10/2013 | Perez Martinez | H04L 41/0896 726/28 |

FOREIGN PATENT DOCUMENTS

| | | | | |
|---|---|---|---|---|
| CA | 2656409 A | * | 1/2008 | H04J 1/16 |
| CA | 2656409 A1 | * | 1/2008 | H04J 1/16 |
| CA | 2656409 C | * | 8/2015 | H04L 45/28 |
| EP | 3300303 A1 | * | 3/2018 | H04M 15/8055 |
| GB | WO 2005/096566 | * | 3/2005 | H04L 12/56 |
| GB | WO 2005/096567 | * | 3/2005 | H04L 12/56 |
| IL | WO 2010/038226 A1 | * | 8/2009 | H04L 12/56 |
| WO | WO-2005096566 A1 | * | 10/2005 | H04L 45/26 |
| WO | WO-2006012346 A1 | * | 2/2006 | H04L 63/1408 |
| WO | WO-2008005393 A2 | * | 1/2008 | H04L 45/22 |
| WO | WO 2010/038226 A1 | * | 9/2008 | H04L 12/56 |
| WO | WO 2011/045553 A1 | * | 7/2010 | H04L 12/56 |
| WO | WO-2010128391 A2 | * | 11/2010 | H04L 41/5029 |
| WO | WO 2012/083285 A2 | * | 12/2011 | H04W 4/26 |

OTHER PUBLICATIONS

H3C Technologies, Multi-Core Distributed NetStream Technology White Paper, 2010.*

H3C, XLOG Network Analysis System, 2006.*

* cited by examiner

SYSTEM, METHOD AND APPARATUS FOR SUBSCRIBER USER INTERFACES

TECHNICAL FIELD

This disclosure relates to methods, apparatus, and systems for user interfaces in network systems. Specifically, this disclosure is related to network systems that include a plurality of subscribers that share a set of network resources.

DESCRIPTION OF THE RELATED TECHNOLOGY

A typical data communication network includes a variety of components or resources. These may include transmission lines, transmitters, receivers, antennas, routers, switches, gateways, firewalls, processors, and the like. Since these resources may require substantial expense to establish and operate, these resources are often shared by a group of subscribers. By sharing the resources of the network, each subscriber derives the benefits made possible by the collective set of network resources. By sharing those resources with other subscribers, each individual subscriber's cost may be reduced to be proportional to their fractional use of the resources. Because the networking resources are shared by multiple subscribers, use by one subscriber may affect the ability of another subscriber to use those same resources. This may be particularly noticeable during time periods of high network resource utilization. A high utilization of network resources may introduce queuing delays within a network, as data must wait to be transmitted or received until resources become available.

In some environments, ensuring adequate network capacity to provide a high performance networking environment for all subscribers may be achieved by building in some degree of over capacity. For example, if a network is running at 50% capacity generally, contention for resources between subscribers is infrequent, as the idle resources provided by the overcapacity can be utilized during periods of peak usage to mitigate any temporary contention that may develop.

However, in environments where networking resources are expensive, operating a data network at overcapacity to reduce contention for network resources may be economically inefficient. A network operator who is unable to efficiently ensure proper sharing of network resources between subscribers may be at a competitive disadvantage due to the increased operating costs associated with running a network at overcapacity.

SUMMARY

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One innovative aspect disclosed is a computer implemented method of managing network utilization in a network where a plurality of subscribers to a data communication service access a set of shared network resources. The method includes electronically monitoring a subscriber's utilization of the shared network resources, and congestion of the shared network resources. The method further includes computing a first set of one or more metrics indicative of an amount of a subscriber's utilization of the shared network resources, based at least in part, on the monitored utilization. The method further includes computing a second set of one or more metrics indicative of an amount of congestion of the shared network resources, based at least in part on the monitored congestion, and presenting subscriber data to the subscriber. The subscriber data may include data representing at least one first metric in the first set of metrics and data representing at least one metric in the second set of metrics.

Another innovative aspect disclosed is a display apparatus displaying a user interface to a data communication service subscriber that accesses a set of shared network resources. The apparatus includes an indicator provided on the display of an amount of the data communication service subscriber's utilization of the shared network resources, and an indicator provided on the display of an amount of congestion of the shared network resources.

Another innovative aspect discloses is a computing system. The computing system includes means for computing a first set of one or more metrics indicative of an amount of a subscriber's utilization of shared network resources, means for computing a second set of one or more metrics indicative of an amount of congestion of the shared network resources, and means for generating subscriber data including data representing one or more metrics in the first set of metrics, and the data representing a one or more metrics in the second set of metrics.

BRIEF DESCRIPTION OF THE DRAWINGS

Like reference numbers and designations in the various drawings indicate like elements.

DETAILED DESCRIPTION

Figure 1:
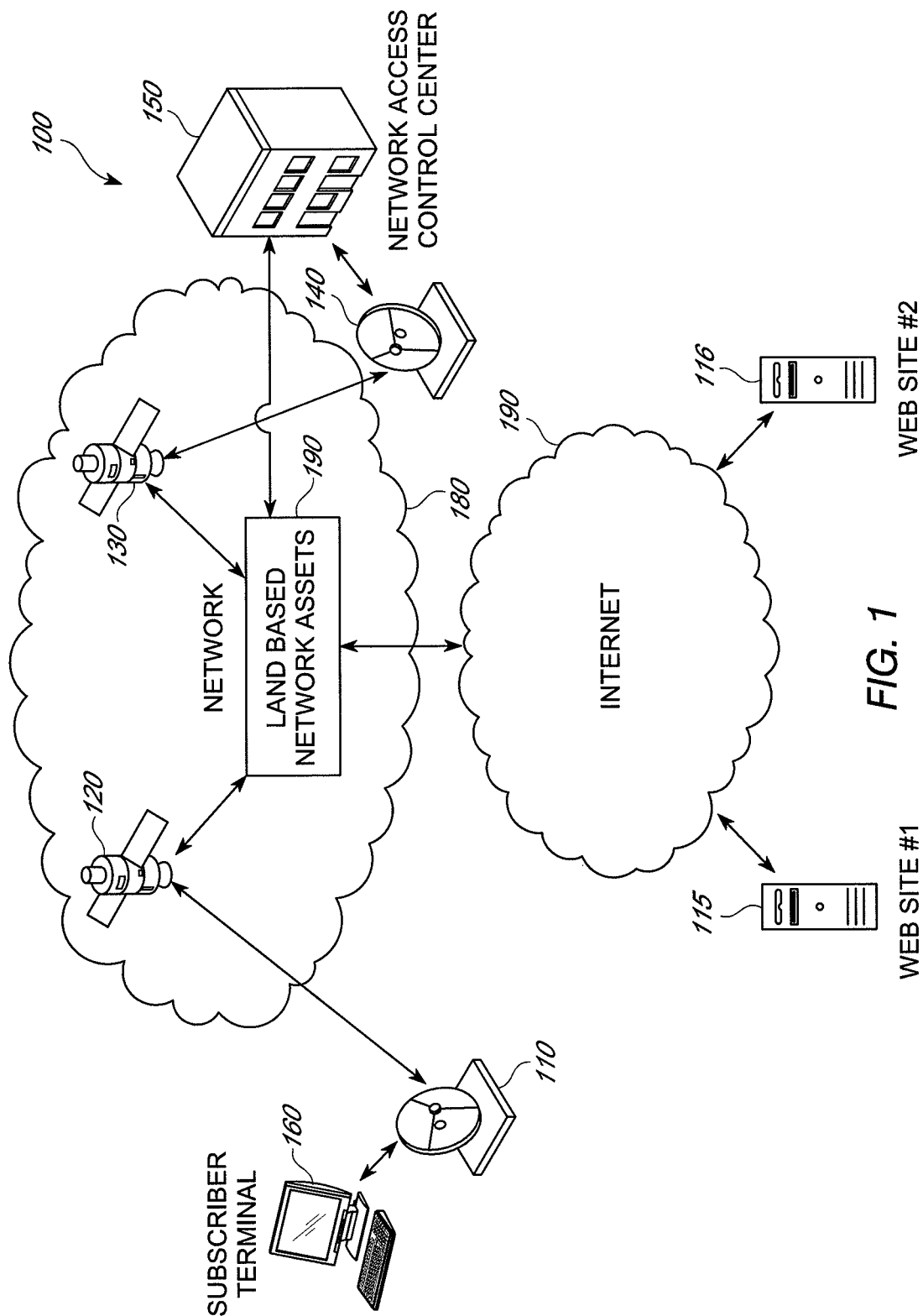
FIG. 1 illustrates a data communication service that includes the Internet, a subscriber and shared network resources.

The following description is directed to certain implementations for the purposes of describing the innovative aspects of this disclosure. However, a person having ordinary skill in the art will readily recognize that the teachings herein can be applied in a multitude of different ways. Thus, the teachings are not intended to be limited to the implementations depicted solely in the Figures, but instead have wide applicability as will be readily apparent to one having ordinary skill in the art.

One way to manage the use of shared network resources between subscribers is by offering a variety of data access plans for purchase by subscribers. These plans may provide varying levels of authorized network usage over a particular period of time, with the costs of the plans proportional to the amount of usage allowed under each plan. Subscribers requiring more usage may purchase plans matching their requirements but at a higher cost than plans purchased by subscribers with less demanding needs. While these plans may offer some ability to create proportionality between a subscriber's use of the shared network resources and their contribution to financing the network, some problems may arise when administering network usage in this way.

For example, some subscribers may not voluntarily abide by the usage limits defined by the data access plans they purchased. Other subscribers may unknowingly exceed their usage limits. When a subscriber exceeds their usage limits under their data access plan, a network operator must determine what course of action to take. It is possible to reduce a subscriber's access speed when their usage exceeds limits defined by their data access plan. It is also possible to cut off usage entirely, perhaps when a subscriber grossly exceeds their plan limits. Another option is to simply charge the subscriber for any excess overage, sometimes at substantially higher proportional cost for the data that is deemed to be over their data access plan limits.

These measures may have some disadvantages. For example, reducing a subscriber's network access speed or blocking their usage entirely may be a significant source of dissatisfaction for some subscribers, especially those subscribers who use their network access to perform important functions. Reduced or blocked usage of the network may be unacceptable for commercial subscribers for example. Similarly, automatic additional charges may be problematic for some subscribers. Charging subscriber's additional money for exceeding data access plan limits may provide some mitigation of the incremental costs associated with exceed use. However, during periods of network congestion, additional automatic charges may not mitigate the performance impact to all subscribers caused by the congestion.

Disclosed herein is another method of managing the network utilization of a plurality of subscribers that access a data communication service that includes a set of shared network resources. The method manages a subscriber's use of the shared network resources by presenting the subscriber with information regarding their utilization of the shared network resources. The method may also present the subscriber with information regarding the network's overall utilization by all subscribers. By gaining an understanding of the context of their network usage, subscribers may proactively alter the manner or extent of their network use to better conform to the limits of their contracted data access plan. In some instances, upon being informed that they are exceeding their plan limits, the subscriber may elect to purchase a data access plan that provides for greater network utilization.

Furthermore, while network restrictions such as reduced network speeds or blocked access have benefits to network operators because of their ability to reduce network utilization, their use has sometimes been limited by concerns for a disproportionate impact to customer satisfaction. However, well informed subscribers may be more tolerant of network access restrictions. The methods disclosed inform subscribers when network restrictions are in place, and also communicate the reasons for those restrictions. These methods may assist subscribers in a rational understanding of their network performance and access, so that they may make educated decisions on how to better manage network activity. These methods may also inform subscribers of steps to remove any restrictions in place. For example, customers may be informed of network data access plans appropriate for their network requirements.

Some methods may restrict a subscriber's network access when their utilization exceeds a threshold. In some implementations, the threshold may be based on the network data access plan purchased by the subscriber. Some other methods may restrict subscribers when an amount of congestion of the shared network resources exceeds a second threshold. Some data access plans may restrict subscribers when their usage of the shared network resources exceeds a threshold, and the amount of congestion of the shared network resources also exceeds a second threshold. The disclosed methods may present metrics to the user representing the subscriber's network utilization relative to a usage threshold. The disclosed methods may also include metrics that represent the amount of congestion of the shared network resources. These metrics may also be used by the network provider to determine whether to restrict the subscriber's network access, for example, by slowing down the subscriber's data transfer rate, or by selectively blocking at least portions of the subscriber's data traffic.

Some implementations have one or more of the following potential advantages. Because the disclosed methods may present information to the subscriber that represents their use of the shared network resources and the amount of congestion of the shared network resources, the subscribers may better conform their use to the boundaries defined in their purchased network data access plans. This may result in reducing overall network utilization, and reduced costs for network operators. Additionally, because subscribers may better understand why restrictions are in place when they have exceeded their network data access plan limits, customer satisfaction may be improved. Furthermore, because customers may better understand steps they can take to purchase additional network capacity to ensure their network usage is within the limits of their data access plan, revenue from network data access plans may increase. This may provide network operators with additional profits, and generally provide for a more competitive product offering.

FIG. 1 illustrates a data communication system 100 including shared network resources 180. Subscribers may use network system 100 to send and receive data with other subscribers (not shown) or other non-subscribing nodes of network 100, such as web site #1 115 or web site #2 116. The illustrated data communication system includes at least two networks, the Internet 190 and the shared network resources 180. The shared network resources 180 may be a private network operated by a private entity. In some implementations, the network 180 may be partially or wholly operated by a public entity. For example, some or all of shared network resources 180 may be a military, educational, or government network. Network 180 may utilize one or more satellites 120 and 130 (which may be the same satellite). Satellite 120 sends and receives data to a data uplink and downlink transceiver 110 to provide data communication services to subscriber via subscriber terminal 160. Satellite 120 may also send data to other network assets 190. These network assets 190 may include land based network assets, and may include switches, routers, transmission lines, base stations, web servers, file servers, and the like, none of which are shown. Network 180 may also include additional satellites, and uplink and downlink transceivers.

In many advantageous implementations, the shared network resources 180 are operated by an Internet service provider (ISP) and the network 190 includes the public Internet. In these implementations, multiple subscribers may be using the shared network resources 180 to send and receive data from servers connected to the public Internet such as servers 115 and 116 of FIG. 1. As described above, the simultaneous use of the network resources 180 by multiple subscribers to access information on the public Internet can lead to the cost, congestion, and customer satisfaction issues described above.

A network access control center 150 may include systems and apparatus to monitor and manage the shared networking resources or network 180. Satellite 130 may send and receive data to and from uplink/downlink transceiver 140, which may send and receive data to and from network access control center 150. For example, network access control center 150 may determine an amount of congestion of the shared network resources illustrated in FIG. 1. Additionally, network access control center 150 may determine an individual subscriber's utilization of the shared network resources 180 illustrated in FIG. 1. The network access control center is illustrated as a separate site in FIG. 1. It will be appreciated, however, that no specific location is to be implied, and the network access control center is essentially another group of network assets that are part of and/or connected to the network 180 which include certain management functionality, some aspects of which are described in further detail below.

Figure 2:
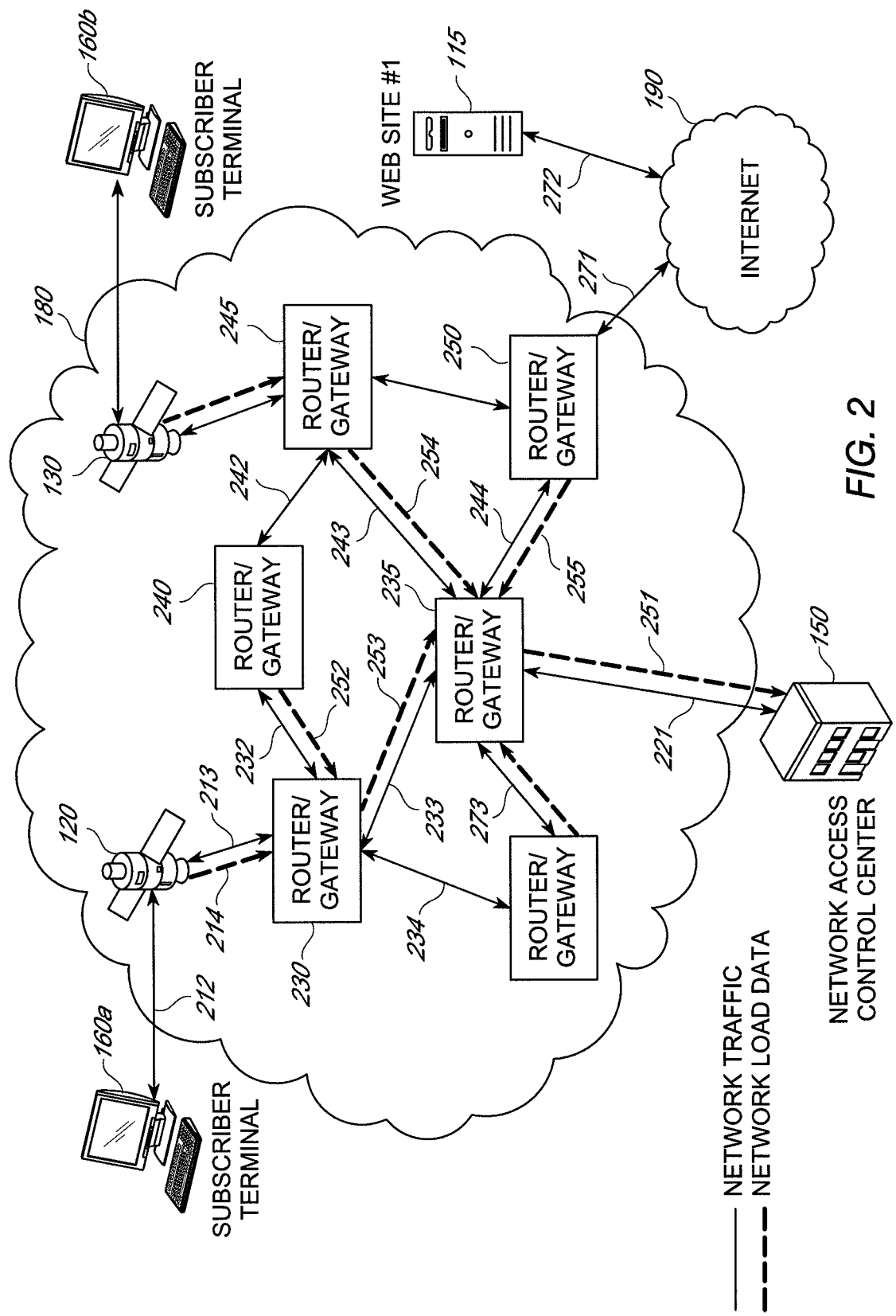
FIG. 2 shows the communication of network traffic and network statistics data between a plurality of router/gateway devices

FIG. 2 shows the communication of network traffic and network statistics data between a plurality of router/gateway devices and network access control center 150. A subscriber may use terminal 160a to send and receive data over a network. A network 180 may include, among other components, one or more router/gateway devices that communicate with each other to route network traffic to its destination. For example, data transmitted from subscriber terminal 160a to web site #1 115 may first traverse link 212 to satellite 120, then to router/gateway 230 over link 213, then over link 233 to router/gateway 235, then link 244 to router gateway 250, and then to the Internet over link 271. The data then reaches web site #1 over link 272.

Some implementations may have a single gateway that routes traffic between at least a first node and a second node. In these implementations, both satellites 120 and 120 may be in communication with a single gateway, for example, router/gateway 230. Communication between a subscriber terminal, such as subscriber terminal 160a, and a web site, such as web site #1 in FIG. 2, would only traverse one gateway when moving from their source to their destination.

The router/gateway devices may also include network monitoring capabilities that maintain statistics representing their utilization and the utilization of the links to which they are attached. For example, router/gateway 230 may measure its utilization as well as the utilization of links 213, 232, 233, and 234. The statistics generated by the router/gateways representing the utilization of links and the routers/gateways may be sent to the network access control center 150 using the links and router/gateway devices of the network.

The flow of this statistical information through the network is illustrated via the dashed arrows of FIG. 2. For example, utilization statistics of router/gateway 240 may be sent over link 232. This is shown as statistics flow 252. The statistics may then be sent to router/gateway 235 via link 233. This is shown as statistics flow 253. Note that statistics flow 253 may include statistics from router/gateway 240 and router/gateway 230. For example, router/gateway 230 may determine its utilization, and the utilization of links 232, 213, 233, and 234 to create utilization statistics. These statistics may then also be sent over link 233 to router/gateway 235. This is shown as statistics flow 253. Therefore, statistics flow 253 may include utilization statistics generated by router/gateway 240 and utilization statistics generated by router/gateway 230.

Router/Gateways 245 and 250 may also send utilization statistics over links 243 and 244 respectively. This is represented as statistics flow 254 and 255 respectively. These statistics may also be received by router/gateway 235.

When statistics arrive at router/gateway 235, they may then be sent to the network access control center 150 over link 221. This is represented as statistics flow 251. Note that router gateway 235 may also determine utilization statistics for itself, and links 273, 221, 243, 244, and 233. This information may also be part of statistics flow 251.

As described, network access control center 150 may receive utilization statistics from one or more network components as described above. In some embodiments, these statistics may be aggregated partially by devices within the network, such as the router/gateways illustrated in FIG. 2. For example, in some implementations, when router/gateway 230 receives usage statistics from router gateway 240 over statistics flow 252, router/gateway 230 may aggregate the statistics from statistics flow 252 with its own statistics, and then forward the statistics to router/gateway 235. In some implementations, the statistics may be at least partially aggregated also by the network access control center 150. By aggregating the statistics from within the network, network access control center 150 may establish the current overall utilization of the network.

Network components within the network may also maintain statistics on a specific individual subscriber's use of the network services offered by the network provider by electronically monitoring a subscriber's utilization of the shared network resources. For example, a router/gateway may determine the amount of data sent to or received by each subscriber. These individual subscriber statistics may also be sent to network access control center 150 by components of the network in a method similar to that described above. Network access control center may then aggregate statistics for each subscriber based on information it receives from the components of the network.

The statistics maintained for each subscriber may represent, at least in part, a representation of the subscriber's utilization of the shared network resources. For example, the statistics may represent amounts of data transmitted or received using the shared network resources over a time period, or over multiple different time periods. The utilization may also include any other measures of network usage, for example, peak data rates, or time weighted data usage, where, for example, data sent or received during "off peak" time periods is discounted when compared to data sent or received during a "peak" time period.

Figure 3:
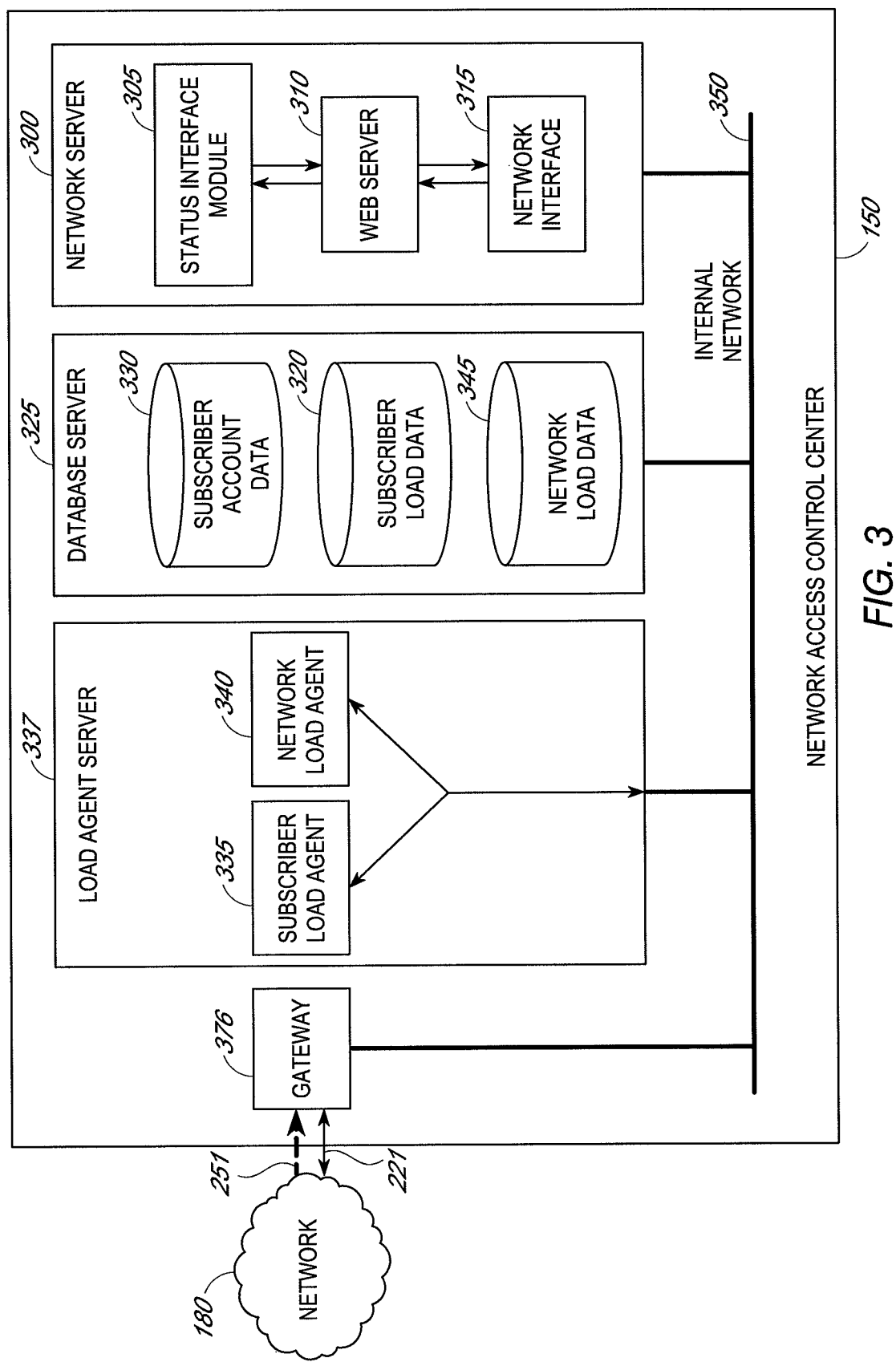
FIG. 3 is a block diagram of a system within a network access control center implementing at least one of the operative embodiments.

FIG. 3 is a block diagram of a system within a network access control center 180 as illustrated in FIG. 2. The system may implement at least one of the operative embodiments. Network access control center 150 receives statistics flow 251 from network 180 over link 221 as described in FIG. 2. Gateway 376 within network access control center receives the statistics and forwards them onto internal network 350. Statistics flow 251 is sent to subscriber load agent 335 and network load agent 340 via internal network 350. Subscriber load agent 335 may identify subscriber specific load information from statistics flow 251 and write the identified information to subscriber load data database 320 using internal network 350. Similarly, network load agent 340 may identify network load information in statistics flow 251 and write the identified information into network load data database 345, also using internal network 350.

Network server 300 may include a web server module 310 that responds to requests from the network for information. Web server module 310 may be included in host program 410, illustrated in FIG. 4, discussed below. Web server 310 may receive a request for a web page via a Hyper Text Transfer Protocol (HTTP) or Hyper Text Transfer Protocol with Secure Sockets Layer (HTTPS) requests from the network via network interface 315. When receiving requests from the network, web server 310 may invoke status interface module 305. Status interface module may also be included in the host program module 410, illustrated in FIG. 4, discussed below. Status interface module 305 may include instructions that configure a processor to assemble statistical information from one or more databases. For example, status interface module may obtain subscriber load data from subscriber load data database 320 via internal network 350. As mentioned, subscriber load data database 320 may be populated with data by one or more subscriber load agents 335. Similarly, status interface module 305 may also obtain network load data from network load data database 345. Status interface module may also obtain subscriber account data from a subscriber account data database 330. Status interface module 305 may process data from these databases and present information to a subscriber via web server 310, internal network 350, and network 180.

Presenting data to a subscriber generally refers to making the data available to the subscriber. This may include displaying the data to the subscriber on their display. For data generated remotely from the subscriber, presenting the data may comprise transmitting the data on network 350 to a subscriber. For example, the transmission may be an HTTP or HTTPS response message that is sent in response to an HTTP or HTTPS request from a subscriber terminal, such as the subscriber terminal 160 illustrated in FIG. 1. The HTTP or HTTPS response message may define a web page to be displayed on the subscriber's terminal. Some implementations may present data to a subscriber using other networking methods, for example, by returning parameters from a remote procedure call. In some implementations, data may be presented in XML format as the return from a SOAP API call.

Alternatively, presenting data to a subscriber may include electronically sending data values, for example in an xml or csv file format, to an entity associated with the subscriber. This data file may then later be assembled into a format that can be interpreted by a subscriber. For example, it may be formatted into a user interface that can be read by a subscriber on an electronic display. Alternatively, the data may be entered into a database and later retrieved by a subscriber or by an entity acting on the subscriber's behalf.

Note that while network server 300 is illustrated as being located inside a network access control center 150, the location of network server 300 is not relevant to the operation of the methods, apparatus, and systems disclosed. Instead, network server 300 may be located anywhere that provides network connectivity to subscribers of the network service that utilizes the shared network resources of network 180.

Furthermore, although the components of network control center are illustrated as including a gateway 376, load agent server 337, database server 325, and network server 300, it is understood that the illustrated architecture of components in FIG. 3 is merely illustrative, and many different hardware and software architectures are possible without departing from the methods, apparatus, and systems described herein.

For example, the databases illustrated on database server 325 could instead be hosted directly on network server 300. Similarly, the load agent server 337 could be combined with database server 325 or network server 300. Alternatively, load agent 335 and 340 could be deployed on separate servers. Furthermore, the illustrated structure of servers should not imply a particular hardware structure. For example, the load agent server 337, database server 325, and network server 300 could be virtualized such that they all run on one server or on any combination or number of physical servers.

Figure 4:
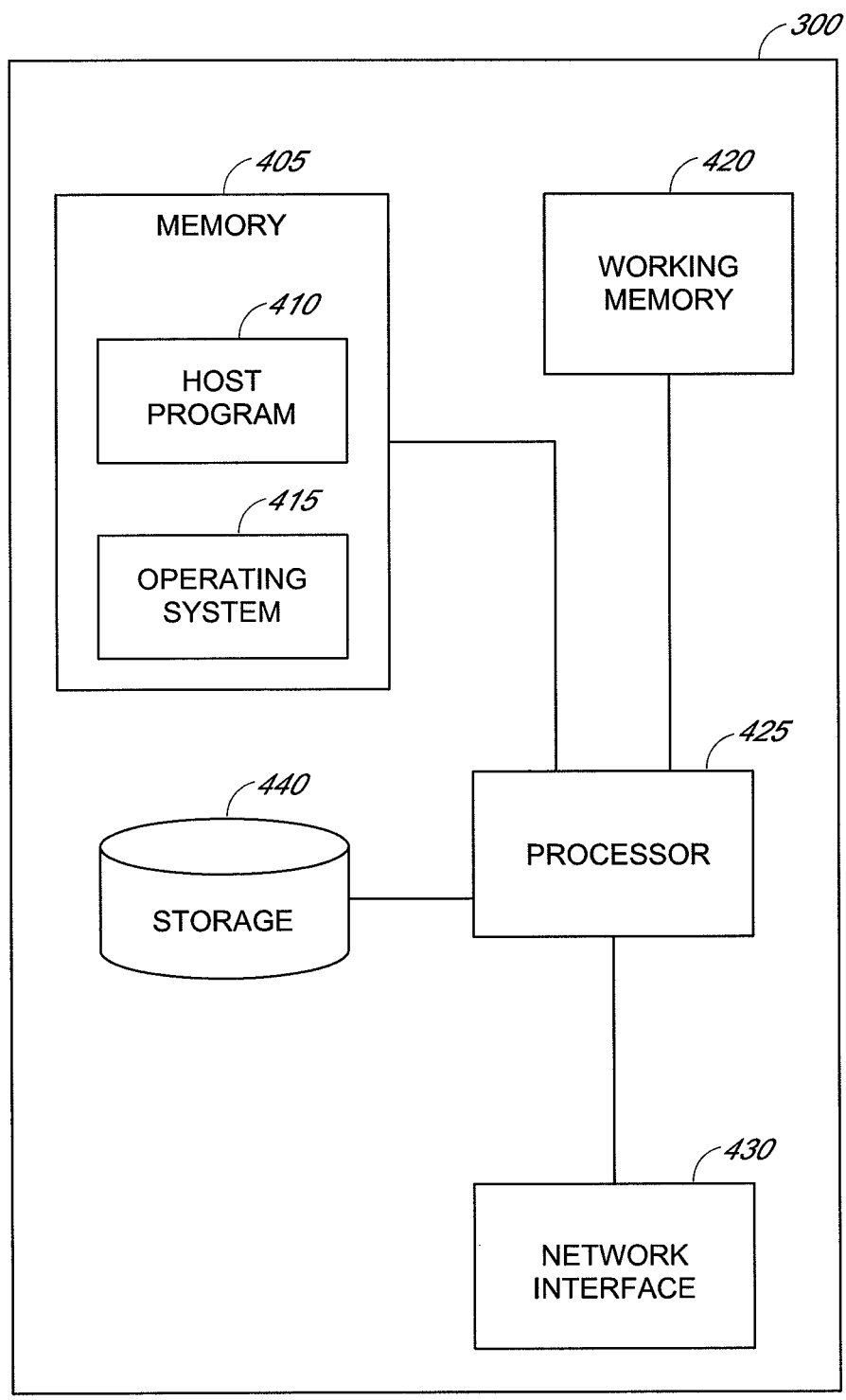
FIG. 4 is a block diagram illustrating components of a network server apparatus implementing at least one operative embodiment.

FIG. 4 is a block diagram of a network server apparatus implementing at least one operative embodiment. In some implementations, the network server 300 illustrated as inside network access control center 150 in FIG. 3, may include components as illustrated in the block diagram of FIG. 4. Server 300 includes a processor 425 that is operatively coupled to a memory 405. Memory 405 includes modules that include instructions that configure processor 425 to perform functions of server 300. For example, memory 405 is illustrated as including a host program 310 and an operating system 415.

Processor 425 is also operatively coupled to a working memory 420. In some implementations, working memory 420 may store, at least temporarily, dynamic data needed to perform the operations of server 300. For example, in some implementations, instructions from host program 410 or operating system 415 may be loaded into working memory 420 before being executed by processor 425. In some implementations, working memory 420 may maintain run time data generated by instructions included in host program 410 or operating system 415.

Process 425 is also operatively coupled to network interface 430. Instructions in host program 410 or operating system 415 may configure processor 425 to send or receive data over network interface 430. Process 425 may also be operatively coupled to a storage 440. While FIG. 4 illustrates storage 440 as a traditional disk device, one skilled in the art would understand storage 440 may include any number of stable storage forms including a hard disk, floppy disk, ram drive, or the like.

Figure 5:
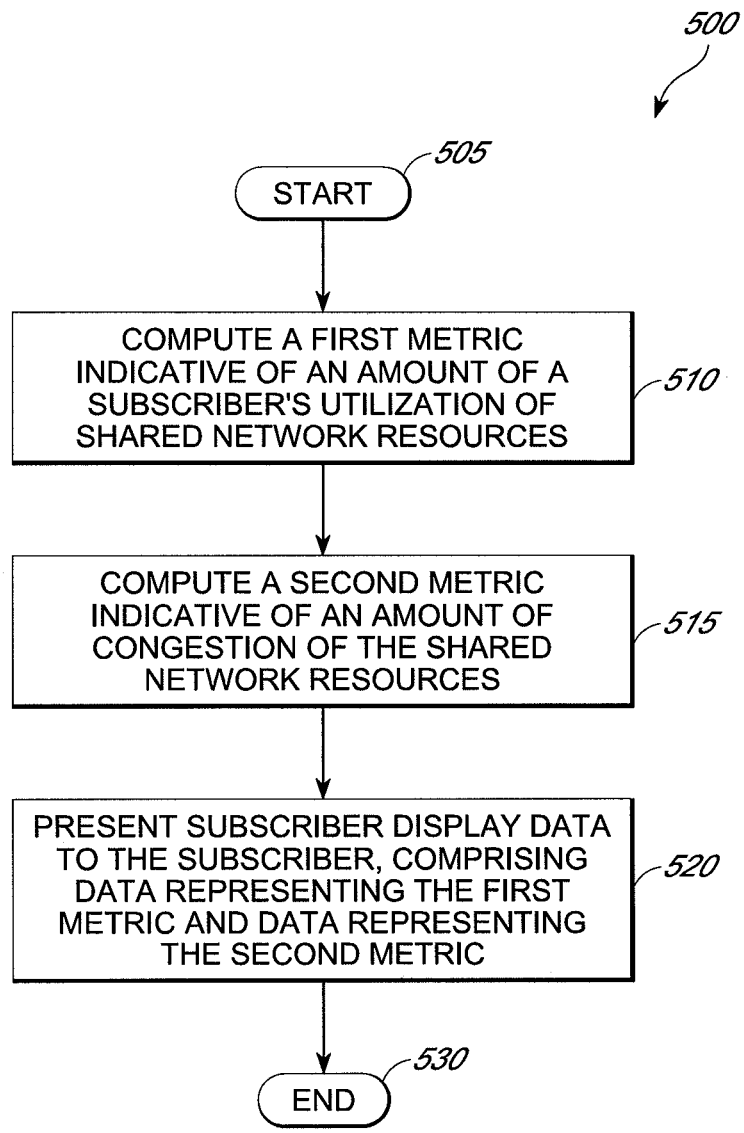
FIG. 5 is a flowchart of a method of managing network utilization.

FIG. 5 is a flowchart of a method of managing network utilization. Process 500 may be implemented by instructions included in host program 410 of FIG. 4. Process 500 may also be implemented by instructions included in the status interface module 305, illustrated in FIG. 3. Process 500 begins at start block 505 and then moves to block 508, where a subscriber's utilization of the shared network resources and congestion of the shared network resources is electronically monitored. Process 500 then moves to block 510, where a first set of one or more metrics indicative of an amount of a subscriber's utilization of shared network resources is computed. The first set of metrics may be based, at least in part, on the subscriber's utilization monitored in processing block 508. To implement block 510, instructions in status interface module 305 may first read data from the subscriber load data database 320, and the subscriber account data database 330. Instructions in status interface module 305 may then determine the subscriber's utilization of shared network resources based on the data. The subscriber's utilization may be represented by one or more metrics in the first set of metrics.

Next, process 500 moves to block 515, where a second set of one or more metrics indicative of an amount of congestion of the shared network resources is computed. The second set of metrics may be based on the congestion monitored in processing block 508. To implement block 515, instructions in status interface module 305 may read network load data from network load database 345, illustrated in FIG. 3. Status interface module 305 may then determine the second set of one or more metrics based on the data. Note that while process 500 is illustrated as performing processing block 510 before processing block 515, some implementations may vary the order of processing blocks 510 and 515 or may perform both at substantially the same time. Because the processes in blocks 510 and 515 are independent, they can performed in any order, at the same time, updated or revised at the same or differing intervals, etc.

Process 500 then moves to block 520, where subscriber display data is presented to a subscriber. The subscriber display data may include a representation of at least one metric in the first set of metrics and a representation of at least one metric in the second set of metrics. The display data may be in an html or an xml data format. The subscriber display data is presented to the subscriber in response to the sending. Presenting subscriber display data to a subscriber may include transmitting subscriber display data on a network to a subscriber. Alternatively, presenting subscriber display data may include displaying subscriber display data on an electronic display. Presenting subscriber display data may also include writing subscriber display data to a datastore accessible to the subscriber, or accessible directly or indirectly to computer programs running on a subscriber terminal. Process 500 may then move to end block 530.

In other implementations of process 500, blocks 508, 510, 515, and 520 may be repeated periodically. For example, process 500 may be performed in response to a request for a web page, for example, in response to an HTTP request sent by a "browser" application. The response to the web page request may include definitions of an html page that includes representations of the first metric and the second metric. The html page may also include an expiration time. After the html page is sent back to the original web page requestor, it may be received by a "browser" application. The browser application may process the expiration time included in the html, and upon expiration of the page, re-request the web page via an HTTP or HTTPS request message.

Figure 6A:
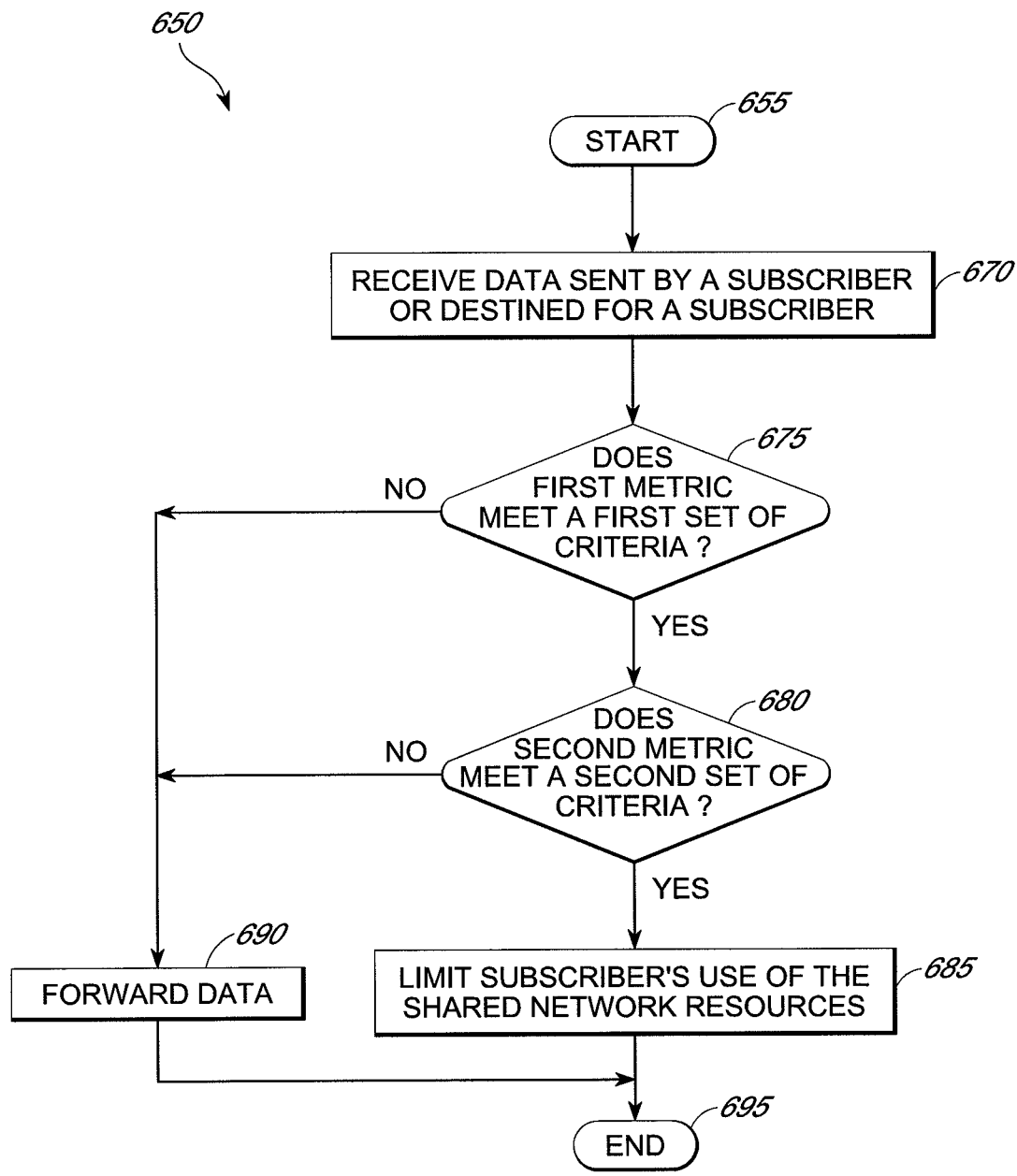
FIG. 6A is a flowchart of a method of managing network utilization.

FIG. 6A is a flowchart of a method of managing network utilization. Process 650 may be implemented by a router/gateway of network 180, illustrated in FIG. 2. Alternatively, process 650 may be implemented by a combination of the router/gateways illustrated in FIG. 2 and instructions in a host program 410 of server 300, illustrated in FIG. 4. Process 650 may also be implemented in whole or in part on a subscriber terminal, such as subscriber terminal 160 in FIG. 1.

Process 650 starts at start block 655 and then moves to processing block 670. In processing block 670, data sent by a subscriber is received or data destined for a subscriber is received. For example, a subscriber may send a web page request via a browser application to a network including shared network resources. Alternatively, a node may send data to a subscriber to a network of shared network resources. For example, in response to a web page request from a subscriber, a web site may send an HTTP response message that includes content of the web site to the subscriber. Alternatively, a streaming web site may send streaming packets to the subscriber to enable the subscriber to watch an Internet video. Process 650 then moves to decision block 675, where process 650 determines whether subscriber utilization and network congestion metrics meet a criteria.

The subscriber utilization metric may represent a subscriber's use of shared network resources at various times or over various time periods. The metrics may measure total usage over a period of days or weeks. Multiple measures over different time periods may be used. Some implementations may measure the composition of subscriber usage during a time period. For example, these implementations may determine a percentage of streaming/real-time data and a percentage of best-effort or non-real-time data sent or received by the subscriber. The composition or type of usage by the subscriber may be represented by one or more metrics included in the first set of metrics.

In some implementations, the network congestion metrics may represent an amount of congestion of the shared network resources. In some implementations, these metrics may provide an evaluation of the amount of network congestion (which may or may not be defined or specified in a subscriber's network data access plan) at a given time. This amount of network congestion may correspond to a level of congestion wherein queuing delays within the network become a significant component of overall network performance. As with subscriber utilization metrics, multiple measures of network congestion may be used.

At decision block 675, the metrics are checked against a defined criteria. As described generally above, the criteria determines whether an excessively heavy user of network resources is accessing the network when congestion is high. In some implementations, this decision can be made based on separate criteria for subscriber utilization and network congestion. For example, one or more subscriber utilization metrics can be compared to one or more thresholds. The thresholds for a given subscriber may be set based on usage limits specified by the subscriber's network data access plan. In addition, one or more network congestion metrics can be compared to one or more thresholds. If the subscriber utilization and network congestion metrics both exceed their respective thresholds, decision block 675 may determine that the criteria is met. If one or both the metrics do not exceed the thresholds, decision block 675 may determine that the criteria is not met.

The criteria used in decision block 675 may include any algorithm that processes the metrics to classify a given subscriber at a given time as overusing the network resources or not. For example, thresholds used in decision block 675 may be dependent on measured values for other metrics, relationships between metric values, or any other individual or combined analysis of metric measurements, and may depend on other factors such as time of day or other characteristics of a given subscriber.

If the metrics do not meet the criteria, process 650 moves to block 690, where the data is forwarded to its destination. If the data is destined for the subscriber, processing block 690 will send the data to the subscriber. If the data was sent by the subscriber, the data will be forwarded to the destination specified. For example, the destination may be specified as part of an IP packet header. If the metrics do meet the criteria, process 650 moves to block 685, where the subscriber's use of the shared network resources is limited.

How use of the shared network resources is limited may vary by implementation. Some implementations may limit the use of the shared network resources by selectively blocking a subscriber's network traffic generated by a set of network applications. For example, some implementations may block streaming applications because they may utilize significant shared network resources. Other applications, such as email and web browsing, may be allowed in these implementations.

Some implementations may limit use of the shared network resources by selectively limiting a subscriber's network traffic to a set of network ports or a set of network destinations. For example, traffic may be limited to a whitelist of hostname or IP addresses in some implementations. Other implementations may block subscriber traffic based on a blacklist of hostnames or IP addresses. Some other implementations may block access to particular destinations based on a category of content stored at the destination. Some implementations may limit use of the shared network resources to a set of network resources.

Other implementations may reduce the network speed for a particular subscriber when limiting the use of shared network resources. In some implementations, the network speed may be reduced for all network applications, while in other implementations; the network speed may be reduced for only a selected set of network applications. For example, some implementations may limit the speed of streaming applications while allowing other network applications to perform at full speed. Some implementations may limit a data download speed while not limiting a data upload speed. In some other implementations, the data upload speed may be limited without limiting the data download speeds. In still other implementations, both the data upload and data download speeds may be limited. Other limitations on the usage of the shared network resources may also be performed by some implementations, and the examples provided above should not imply the disclosed systems, methods, and apparatus are limited to the examples.

After processing block 690 or block 685 completes, process 600 then moves to end block 695. Although FIGS. 6A (and 6B described below) show the decision blocks operating for every data packet transfer, the method could instead periodically measure the metrics for a given subscriber and assign a classification to the subscriber based on the meeting or not meeting the criteria, where the classification determines the whether the subscriber's use of the shared network resources is limited. This classification could remain in force for particular periods of time before reclassification is permitted. The criteria for changing a subscriber's classification could be different depending on the current classification. Messages could be sent to the subscriber informing them of a planned or impending reclassification.

Figure 6B:
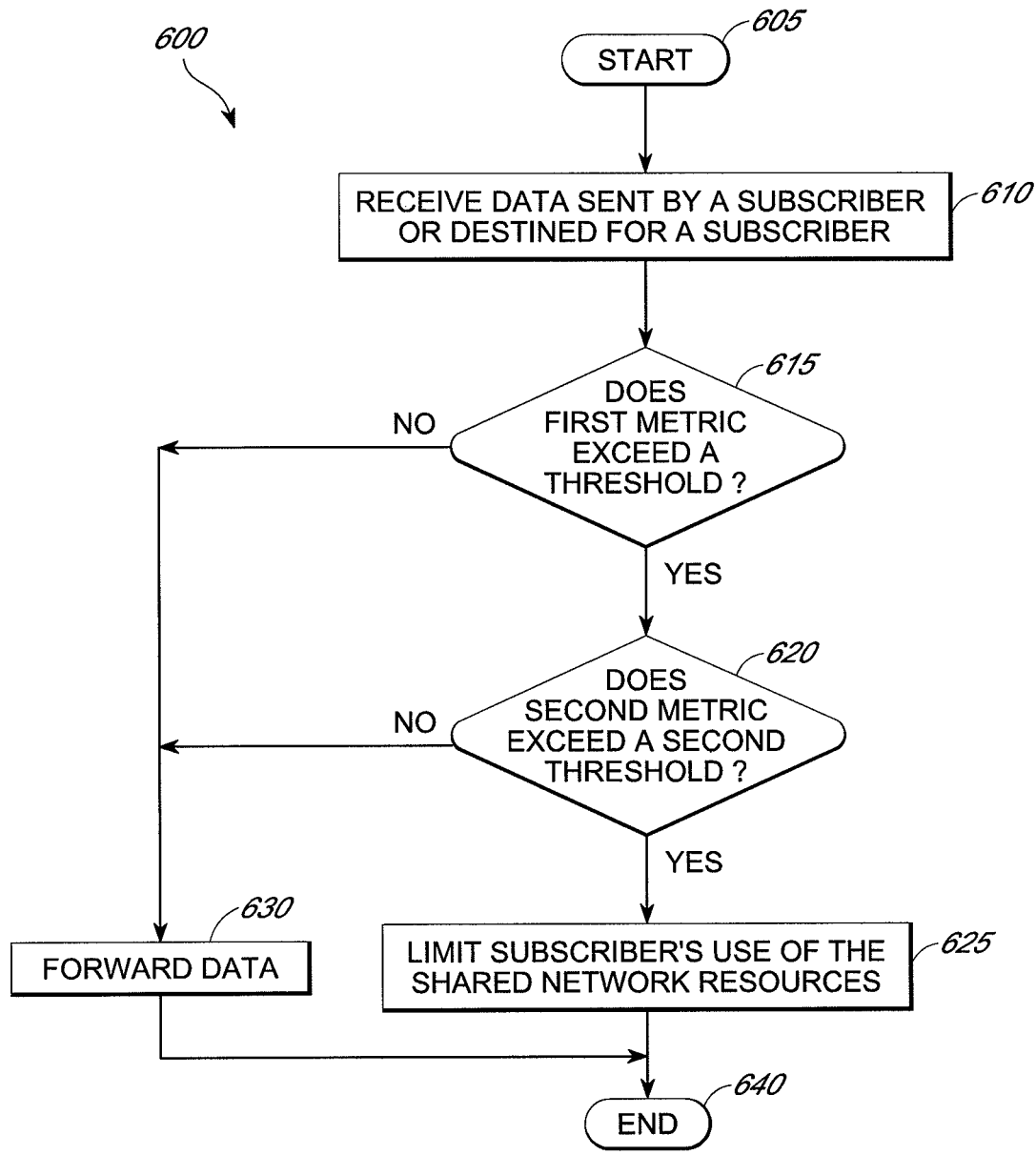
FIG. 6B is a flowchart of a method of managing network utilization.

FIG. 6B is a flowchart of a method of managing network utilization. Process 600 is one specific example of process 650, illustrated in FIG. 6A. Process 600 may be implemented by a router/gateway of network 180, illustrated in FIG. 2. Alternatively, process 600 may be implemented by a combination of the router/gateways illustrated in FIG. 2 and instructions in a host program 410 of server 300, illustrated in FIG. 4.

Process 600 starts at start block 605 and then moves to block 610 where data sent by a subscriber is received or data destined for a subscriber is received. For example, a subscriber may send a web page request via a browser application to a network including shared network resources. Alternatively, a node may send data to a subscriber to a network of shared network resources. For example, in response to a web page request from a subscriber, a web site may send an HTTP response message that includes content of the web site to the subscriber. Alternatively, a streaming web site may send streaming packets to the subscriber to enable the subscriber to watch an Internet video.

Process 600 then moves to decision block 615, where process 600 determines whether a first metric exceeds a threshold. For example, the first metric may represent a subscriber's utilization of shared network resources. In some implementations, the threshold may represent a usage limit defined by the subscriber's network data access plan. If the first metric does not exceed a threshold, process 600 moves to block 630, where the data is forwarded to its destination. If the data is destined for the subscriber, processing block 630 will send the data to the subscriber. If the data was sent by the subscriber, the data will be forwarded to the destination specified. For example, the destination may be specified as part of an IP packet header. If the first metric does exceed the threshold, process 600 moves to decision block 620, which determines whether a second metric exceeds a second threshold. In some implementations, the second metric may represent an amount of congestion of the shared network resources. In some implementations, the second threshold may represent an amount of network congestion (which may or may not be defined or specified in a subscriber's network data access plan). This amount of network congestion may correspond to a level of congestion wherein queuing delays within the network become a significant component of overall network performance.

If the second metric does not exceed the threshold, process 600 moves to block 630 where the data received from the subscriber is forwarded to its destination. If the second metric does exceed a threshold, process 600 moves to block 625, where the subscriber's use of the shared network resources is limited. After processing block 630 or block 625 completes, process 600 then moves to end block 640.

Figure 7:
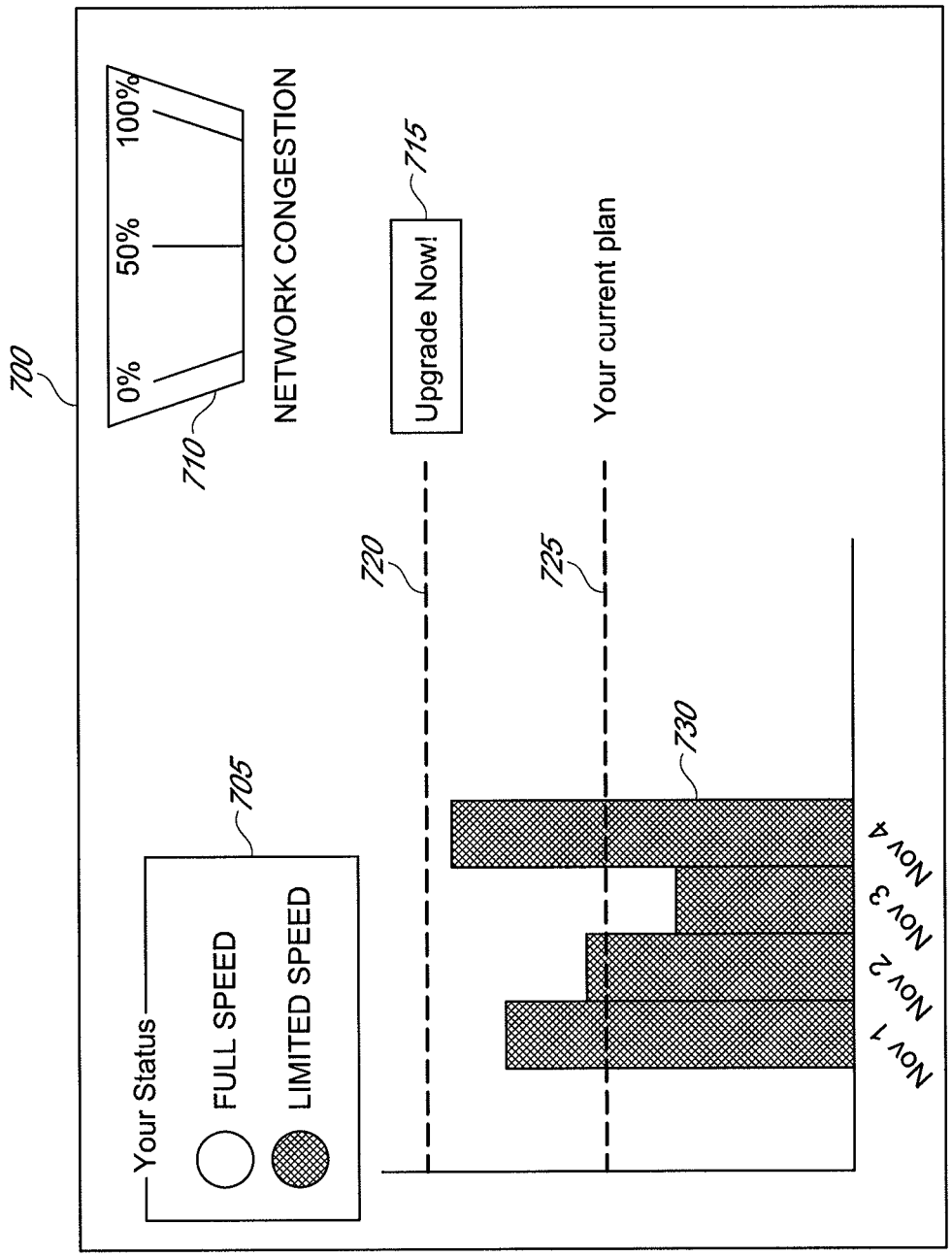
FIG. 7 illustrates one implementation of a user interface presenting subscriber display data.

FIG. 7 illustrates one implementation of a user interface 700 presenting subscriber display data. The user interface 700 may be displayed on a subscriber terminal, such as terminal 160 in FIG. 1. The user interface 700 may be at least partially generated by the network server 300, illustrated in FIGS. 3 and 4. For example, network server 300 may generate a representation of data displayed in user interface 700.

User interface 700 may include a status indicator 705 that indicates whether the subscriber's data communication over a network is currently at a full speed or a limited speed. In some implementations, the subscriber's speed may be limited if the subscriber's usage of shared networking resources have exceeded the usage limits provided in a data access plan. In some implementations, limiting the speed of a subscriber may also be conditional on an amount of congestion of the shared network resources. This information is displayed in gauge 710.

In the example of FIG. 7, gauge 710 shows the current network congestion at approximately 75%. Some implementations may define a threshold at which network congestion effects whether a subscriber's speed is limited. For example, when network congestion is below a threshold, in some implementations, subscriber's speeds are not limited, as there may be adequate resources available to provide acceptable performance to all subscribers. When network congestion exceeds the threshold, a subscriber whose use of the shared network resources has exceeded the limits of their data access plan may be limited in either network speed or network capacity.

User interface 700 illustrates this concept in graph 730. Graph 730 shows a subscriber's use of network resources on four example consecutive days. These days are illustrated as November 1, November 2, November 3, and November 4. Also illustrated in user interface 700 is a line 725 that indicates the level of usage allowed by the subscriber's current network data plan. As a subscriber may observe from user interface 700, the subscriber's use of the shared network resources exceeded the limits of their current data access plan on three of the four days illustrated in user interface 700. For example, the subscriber's use of the shared network resources exceeded the limits on November 1, November 2, and November 4. On November 3, the subscriber's use of the shared network resources was below the limits allowed by their current network data access plan. In some implementations, use of the shared network resources that exceeds the limits provided by the subscriber's data access plan, as shown by graph 730 and line 725, may result in the speed of the subscriber's data connection being limited. As mentioned, the limiting of subscriber's network speed may be conditional on whether the overall network utilization is above a threshold. For example, if the network utilization threshold is 50%, the user interface of FIG. 7 illustrates the network utilization exceeding the threshold, since network utilization is shown at approximately 75%. In the illustrated implementation of user interface 700, an "upgrade now" button 715 is provided. This will allow the subscriber to easily upgrade their data access plan to provide for higher usage limits, such as the limit illustrated by line 720. For example, in some implementations, clicking on the "update now" button 715 may open a browser window using a URL for a subscription management web page supported by the network provider. Using this subscription management web page, the subscriber may be able to change their data access plan to a plan that provides for higher usage limits, perhaps at a higher cost.

While graph 730 illustrates the monitoring of a subscriber's aggregated usage over four consecutive days, other implementations could monitor the subscriber's aggregated usage over different time periods. For example, the monitoring of subscriber usage over a billing period could be displayed in graph 730. Alternatively, usage during a particular calendar month might be monitored and displayed in graph 730 in other implementations. A subscriber's aggregated usage per hour might also be displayed in graph 730 in some implementations. Some other implementations might vary the display of graph 730 based on a parameter. For example, a network provider may offer several different service plans to subscribers. The monitoring period for some plans may differ from the monitoring period of other plans. The monitoring period shown in graph 730 may then depend at least in part on which plan a particular subscriber chooses. The software instructions implementing user interface 700 and graph 730 may programmatically determine the monitoring period for the current subscriber and display a version of graph 730 compatible with the plan chosen by the subscriber.

By viewing user interface 700, a subscriber may understand the current status of their network connection, and in some cases, why they may be experiencing slower performance. The subscriber may also be able to understand the current congestion level of the shared network resources, and from this information gain an appreciation for why the network service provider may have limited their network speed or other aspects of their network service.

The situational awareness provided by user interface 700 may lead the customer to take additional steps that ultimately assist a network provider with maintaining a competitive business model. For example, a subscriber may reduce their usage in some cases if user interface 700 helps them identify that their current or average usage exceeds the limits provided by their network data access plan. Alternatively, the subscriber may purchase a higher priced plan that increases their usage limit, which will result in additional revenue for the network service provider. Regardless of the action the subscriber chooses to take, their customer satisfaction may be improved because they are able to gain an informed perspective on their network service by viewing user interface 700. Increased revenue, reduced network congestion, and improved customer satisfaction make the disclosed methods, systems, and apparatus for managing network utilization desirable for many network service providers.

While FIG. 7 illustrates a user interface that may be presented within a browser application and shown on a computer display, some implementations may include other display designs. For example, some implementations may include a client application that runs on the user terminal, and displays subscriber data within the application window. In these implementations, the layout and contents of the application window displayed to the user may be defined by the application code running on the user terminal, and not by data received from the network, as in a browser based application.

Some implementations may present subscriber data via a system tray icon, for example, using the Microsoft Windows® operating system. Some implementations may provide a display of subscriber data within a semi-transparent permanent floating display window. Some implementations may provide a display window that fades when not an active window, for example, when a mouse pointer is not positioned within its border. These implementations may return the window to a semi-transparent display mode when the window is moused over.

Figure 8:
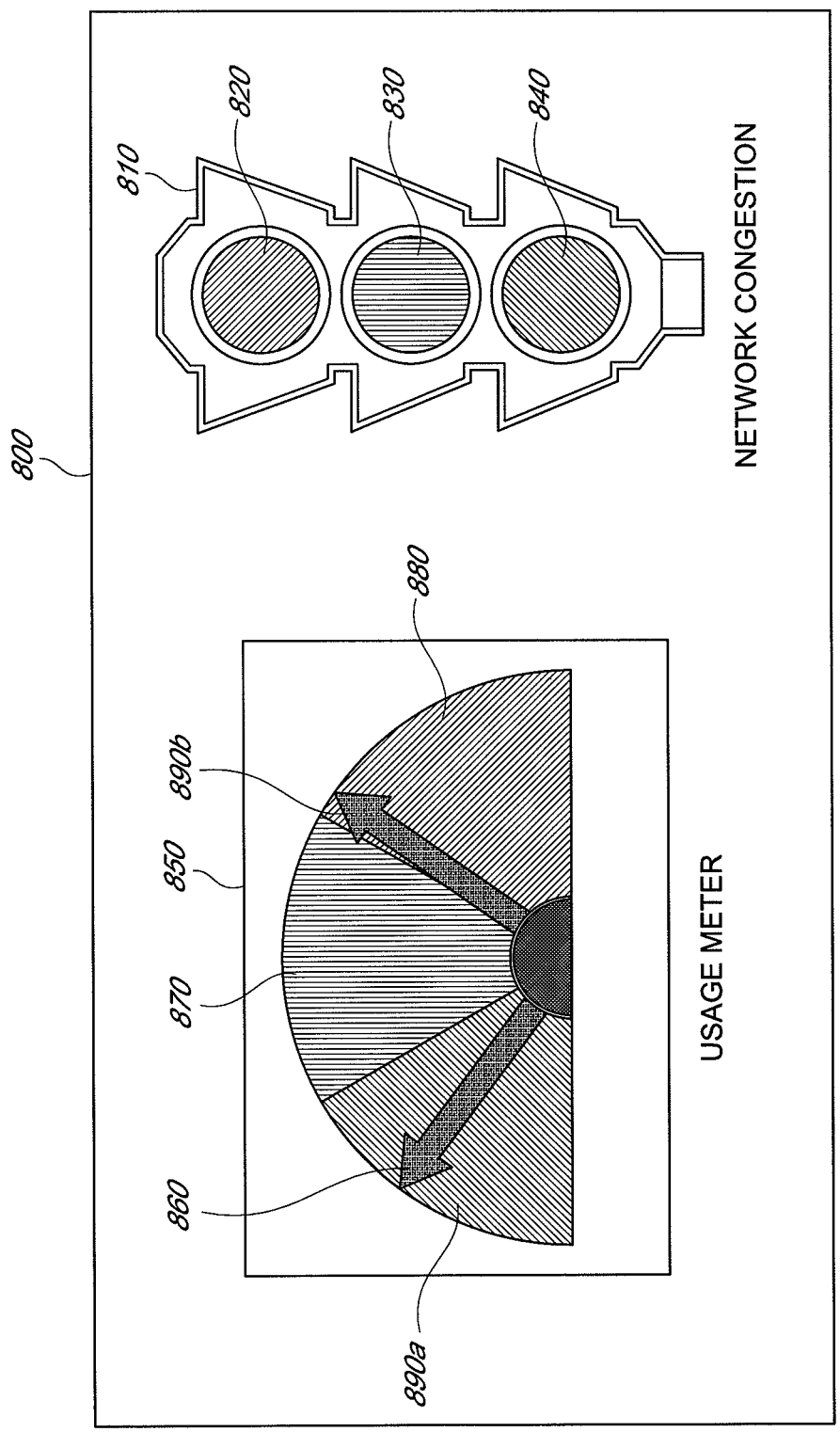
FIG. 8 illustrates another implementation of a user interface presenting subscriber display data.

FIG. 8 shows another implementation of a user interface presenting subscriber display data. Components of user interface 800 include a usage meter 850 and a network congestion traffic light 810.

Usage meter 850 includes three usage zones, indicated as zone 860, zone 870, and zone 880. In some implementations, color may be used to delineate the zones of usage meter 850. For example, the zones may be colored in various shades of green, yellow, red, blue, orange, and white. For example, in one implementation, zone 880 may be red, while zone 860 may be green. In this implementation, zone 870 may be yellow.

Color may also be used to communicate the meaning of each zone in some implementations. For example, zone 880 may be colored red in some implementations to indicate usage that is disfavored by the network provider. Zone 860 may be shaded green to indicate usage that is favorable. For example, usage could be considered favorable if it falls within the boundaries defined by the subscriber's network data plan. Zone 870 may be shaded yellow to indicate usage is somewhere between a favorable status, represented by zone 860 in some implementations, and disfavored status, represented by zone 880 in some implementations. In these implementations, a network provider may not limit a subscribers network access or network speed when their usage remains in a favored zone. This may indicate the subscriber's usage falls within the limits of their current data access plan.

Other implementations may vary how the zones of usage meter 850 are mapped to a particular status. For example, in some implementations zone 880 may represented a favored status and zone 860 may represent a disfavored status. The meanings and locations of these zones may also vary by cultural preferences of the subscriber's local area.

Usage meter 850 also includes an indicator or needle 890. Indicator 890 may move to communicate a current aggregate usage. This aggregate usage may be for a period of minutes, hours, days, weeks, months, years, or any other arbitrary period of time. Indicator 890 is illustrated in two positions as 890*a-b*. When needle 890 is in position 890*a*, it may indicate the subscriber's usage is characterized by zone 860. Indicator 890 may also move to the position represented by indicator 890*bb*. In this position, the needle 890 may indicate the subscriber's usage is characterized by zone 880.

Network congestion traffic light 810 shows three status indicators. A top indicator 820, middle indictor 830, and bottom indicator 840. The zones of network congestion traffic light 810 may also be delineated by color in some implementations. For example, top indicator 820 may be colored red in some implementations, middle indicator 830 may be colored yellow in some implementations, and lower indicator 840 may be colored green in some implementations.

In some implementations a particular colored light of the traffic light or a particular positional orientation of a light may indicate the state of network congestion at the present time. For example, in some implementations, a green light in the traffic light indicates that network congestion is relatively light and will not effect a subscriber's ability to send or receive data on the network.

A red light may indicate the most severe state of network congestion. This may also indicate to a subscriber that their ability to send and receive traffic on the network may be affected. The subscriber's ability to send and receive data on the network may be particularly effected when the light is red if the usage meter indicator 850 indicates that the subscriber's current usage has a disfavored status.

A yellow light may indicate that the network is experiencing some congestion. In some implementations, subscribers with a usage meter indicating their aggregate usage is within a favored zone, for example, zone 860 in some implementations, may experience no adverse ability to send or receive network data when the light indicates a yellow status. In some implementations, subscriber's with an aggregate usage indicating a disfavored status, such as would be indicated by needle 890 being in position 890*b* in some implementations, may be affected when the traffic light is showing a yellow light.

In some implementations, a subscriber's expectations after viewing a user interface including usage meter 850 and traffic light 810 may be based on table 1 below:

TABLE 1

| | | Traffic Light 810 | | |
|---|---|---|---|---|
| | | Green Network (position 840) | Yellow Network (position 830) | Red Network (position 820) |
| Usage Meter 850 | Green (zone 860) | Subscriber is not limited | Subscriber may not be limited by the network provider but may experience some network delays due to contention for network resources | Subscriber is not limited (subscriber's data may displace data of users with a yellow or red usage meter) |
| | Yellow (zone 870) | Subscriber is not limited | Subscriber may not be limited by the network provider but may experience some network delays due to contention for network resources | Subscriber may be limited unless they upgrade their data access plan. |

TABLE 1-continued

| | | Traffic Light 810 | | |
|---|---|---|---|---|
| | | Green Network (position 840) | Yellow Network (position 830) | Red Network (position 820) |
| | Red (zone 880) | Subscriber is not limited | Subscriber may be limited unless they upgrade their data access plan | Subscriber may be limited unless they upgrade their data access plan |

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing modules, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A computer implemented method of managing network utilization in a network where a plurality of subscribers to a data communication service access a set of shared network resources, comprising
electronically monitoring a subscriber's utilization of the shared network resources, and congestion of the shared network resources;
computing a first metric indicative of an accumulated amount of the subscriber's utilization of the shared network resources with respect to a utilization limit defined by a data access plan of the subscriber, at least in part, on the monitored utilization;
computing a second metric indicative of a current amount of congestion of the shared network resources due to usage of the shared network resources by the plurality of subscribers, based at least in part on the monitored congestion;
presenting simultaneously on an electronic display associated with the subscriber:
first data representing the first metric relative to the utilization limit of the data access plan of the subscriber, and
second data representing the second metric;
determining whether to limit the subscriber's use of the shared network resources based on the first metric and the second metric;
responsive to the first metric exceeding a first threshold and the second metric exceeding a second threshold;

limiting the subscriber's use of the shared network resources,
displaying a notification indicating the limiting is in response to the first metric meeting the first threshold and the second metric meeting the second thresholds, and
presenting an option to upgrade the utilization limit of the data access plan simultaneously with presenting the first data, the second data, and the notification; and
otherwise, maintaining a current level of usage of the shared network resources by the subscriber;
wherein the limiting the subscriber's use of the shared network resources is maintained for a predetermined period of time, and further comprises removing the limit of the subscriber's use of the shared network resources after at least one of the predetermined period of time has elapsed, the second metric not exceeding the second threshold, or the receipt of a request to upgrade the utilization limit of the data access plan in response to the option to upgrade.

2. The method of claim 1, further comprising receiving a request for a web page from the subscriber.

3. The method of claim 2, wherein the presented first data and the presented second data are transmitted over a computer network as part of a web page in response to receiving the request for a web page.

4. The method of claim 1, wherein the presented first data and the presented second data are selected from html data and xml data.

5. The method of claim 1, comprising periodically updating and transmitting the presented first data and the presented second data.

6. The method of claim 1, wherein limiting the subscriber's use of the shared network resources includes limiting at least one data speed available to the subscriber.

7. The method of claim 1, wherein limiting subscriber use comprises preventing at least some data transfer activities.

8. The method of claim 1, wherein the subscriber's use is limited to one or more of a set of network applications, a set of network destinations, or a set of network ports.

9. A computing system where a plurality of subscribers to a data communication service access a set of shared network resources, comprising:
means for computing a first metric indicative of an accumulated amount of a subscriber's utilization of the shared network resources with respect to a utilization limit defined by a data access plan of the subscriber;
means for computing a second metric indicative of an amount of current congestion of the shared network resources due to usage of the shared network resources by the plurality of subscribers;
means for presenting simultaneously on a display of a subscriber terminal:
first data representing the first metric relative to the utilization limit of the data access plan of the subscriber, and
second data representing the second metric; and
means for determining whether to limit the subscriber's use of the shared network resources based on the first metric and the second metric;
means, responsive to the first metric exceeding a first threshold and the second metric exceeding a second threshold, for simultaneously:
limiting the subscriber's use of the shared network resources, displaying a notification indicating the limiting is in response to the first metric meeting the first threshold and the second metric meeting the second thresholds, and presenting an option to upgrade the utilization limit of the data access plan simultaneously with presenting the first data, the second data, and the notification; and means for maintaining a current level of usage of the shared network resources by the subscriber responsive to the first metric being below the first threshold or the second metric being below the second threshold;

wherein the limiting the subscriber's use of the shared network resources is maintained for a predetermined period of time, and further comprises removing the limit of the subscriber's use of the shared network resources after at least one of the predetermined period of time has elapsed, the second metric not exceeding the second threshold, or the receipt of a request to upgrade the utilization limit of the data access plan in response to the option to upgrade.

10. The computing system of claim 9, further comprising means for transmitting the first data and the second data over a computer network for display to the subscriber terminal.

11. The computing system of claim 9, wherein the means for presenting is configured to present on the display an indicator of the subscriber's expected network performance simultaneously with the presented first data and the presented second data.

12. The computer implemented method of claim 1, wherein the subscriber's use of the shared network resources is not limited if the second metric is below a first threshold.

13. The computer implemented method of claim 12, wherein the subscriber's use of the shared network resources is limited in response to the first metric exceeding a second threshold and the second metric exceeding a third threshold.

14. The computer implemented method of claim 13, wherein the subscriber's use of the shared network resources is not limited in response to the first metric dropping below the second threshold.

15. The computer implemented method of claim 1, wherein the presenting simultaneously the first data and the second data comprises:
categorizing the subscriber's utilization into one of three utilization categories;
categorizing the network congestion into one of three congestion categories; and
indicating the one utilization category and the one congestion category simultaneously on the display.

16. The computer implemented method of claim 1, further comprising:
displaying a traffic light graphic on the electronic display associated with the subscriber, the traffic light graphic simultaneously displaying first, second, and third icons; and
displaying one of the first icon with a red color, second icon with a yellow icon, and the third icon with a green color based on the second data.

17. The method of claim 1, wherein the presenting of the first data, the second data, the notification, and the option to upgrade on the electronic display is in response to the limiting.

18. The method of claim 17, wherein the presenting of the first data, the second data, the notification, and the option to upgrade on the electronic display is performed without network operator intervention.

19. The computing system of claim 9, wherein the means for presenting the first data, the second data, the notification, and the option to upgrade is configured to present the data on the display in response to the limiting.

20. The computing system of claim 19, wherein the means for presenting is configured to present the first data, the second data, the notification, and the option to upgrade on the display without network operator intervention.

21. The method of claim 1, wherein the presenting further comprises presenting the second data relative to an overall usage capacity limit of the shared network resources.

* * * * *